US011946621B2

(12) United States Patent
Soer et al.

(10) Patent No.: US 11,946,621 B2
(45) Date of Patent: *Apr. 2, 2024

(54) INTEGRATED OPTICAL SYSTEM FOR DYNAMIC DIFFUSE AND DIRECTIONAL LIGHTING

(71) Applicant: Lumileds LLC, San Jose, CA (US)

(72) Inventors: Wouter Soer, Utrecht (NL); Johannes Willem Herman Sillevis Smitt, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,382

(22) Filed: Apr. 27, 2023

(65) Prior Publication Data

US 2023/0258317 A1 Aug. 17, 2023

Related U.S. Application Data

(63) Continuation of application No. 17/582,649, filed on Jan. 24, 2022, now Pat. No. 11,668,452, which is a (Continued)

(51) Int. Cl.

*F21V 14/06* (2006.01)
*F21K 9/61* (2016.01)

(Continued)

(52) U.S. Cl.

CPC ................ *F21V 14/06* (2013.01); *F21K 9/61* (2016.08); *F21V 23/003* (2013.01); *F21Y 2115/10* (2016.08)

(58) Field of Classification Search

CPC .......... F21V 14/06; F21V 23/003; F21K 9/61; F21Y 2115/10

See application file for complete search history.

(56) References Cited

U.S. PATENT DOCUMENTS

| | | | |
|---|---|---|---|
| 6,102,559 A | 8/2000 | Nold et al. | |
| 11,262,048 B2 | 3/2022 | Wouter et al. | |

(Continued)

FOREIGN PATENT DOCUMENTS

| | | | |
|---|---|---|---|
| CN | 1924671 A * | 3/2007 | .......... G02B 6/0038 |
| CN | 101251674 | 8/2008 | |

(Continued)

OTHER PUBLICATIONS

"U.S. Appl. No. 17/020,390, Non Final Office Action dated Jun. 24, 2021", 7 pgs.

(Continued)

*Primary Examiner* — Mary Ellen Bowman

(74) *Attorney, Agent, or Firm* — Schwegman, Lundberg & Woessner, P.A.

(57) ABSTRACT

An illumination system can produce a dynamically variable illumination pattern. The illumination system can include a light guide. The illumination system can include projection optics, which can contribute to the illumination pattern at relatively low beam angles (i.e., beam angles formed with respect to a surface normal of the light guide). The projection optics can include individually addressable light-producing elements that can direct light through one or more focusing elements. A controller can control which of the light-producing elements are electrically powered and can therefore control the illumination pattern contribution from the projection optics. The illumination system can also include scattering optics, which can contribute to the illumination pattern at relatively high beam angles. The scattering optics can direct light out of the light guide over a relatively large surface area, which can help reduce glare when the light guide is viewed directly.

20 Claims, 8 Drawing Sheets

Related U.S. Application Data continuation of application No. 17/020,390, filed on Sep. 14, 2020, now Pat. No. 11,262,048.

(60) Provisional application No. 63/047,631, filed on Jul. 2, 2020.

(51) Int. Cl.
*F21V 23/00* (2015.01)
*F21Y 115/10* (2016.01)

(56) References Cited

U.S. PATENT DOCUMENTS

| | | | | |
|---|---|---|---|---|
| 11,360,257 | B1* | 6/2022 | Kuo | G02B 6/0065 |
| 11,668,452 | B2 | 6/2023 | Soer et al. | |
| 2013/0016526 | A1* | 1/2013 | McCollum | G09F 13/18 362/607 |
| 2014/0056029 | A1* | 2/2014 | He | G02B 6/0011 362/611 |
| 2014/0091332 | A1 | 4/2014 | Medendorp, Jr. et al. | |
| 2016/0259115 | A1* | 9/2016 | Kitano | G02B 5/0242 |
| 2018/0267344 | A1 | 9/2018 | Wu | |
| 2020/0116917 | A1* | 4/2020 | Lee | G02B 6/0073 |
| 2022/0003385 | A1 | 1/2022 | Wouter et al. | |
| 2022/0221132 | A1 | 7/2022 | Soer et al. | |

FOREIGN PATENT DOCUMENTS

| | | | | |
|---|---|---|---|---|
| CN | 101688646 | | 3/2010 | |
| CN | 102160461 | | 8/2011 | |
| CN | 102498422 | | 6/2012 | |
| CN | 104238186 | | 12/2014 | |
| CN | 104541190 | | 4/2015 | |
| CN | 111045140 | | 4/2020 | |
| CN | 116157622 | A | 5/2023 | |
| EP | 2157366 | A1 | 2/2010 | |
| JP | 2012248532 | | 12/2012 | |
| JP | 2013062074 | | 4/2013 | |
| JP | 2020064270 | | 4/2020 | |
| KR | 102587669 | | 10/2023 | |
| WO | WO-2008152561 | A1 * | 12/2008 | F21K 9/00 |
| WO | WO-2008152561 | A1 | 12/2008 | |
| WO | 2019224041 | | 11/2019 | |
| WO | WO-2022006218 | A1 | 1/2022 | |

OTHER PUBLICATIONS

"U.S. Appl. No. 17/020,390, Notice of Allowance dated Oct. 21, 2021", 7 pgs.
"U.S. Appl. No. 17/020,390, Response filed Sep. 24, 2021 to Non Final Office Action dated Jun. 24, 2021", 12 pgs.
"U.S. Appl. No. 17/582,649, Final Office Action dated Nov. 25, 2022", 6 pgs.
"U.S. Appl. No. 17/582,649, Non Final Office Action dated Aug. 4, 2022", 6 pgs.
"U.S. Appl. No. 17/582,649, Notice of Allowance dated Feb. 1, 2023", 7 pgs.
"U.S. Appl. No. 17/582,649, Preliminary Amendment filed Apr. 1, 2022", 7 pgs.
"U.S. Appl. No. 17/582,649, Response filed Jan. 17, 2023 to Final Office Action dated Nov. 25, 2022", 7 pgs.
"U.S. Appl. No. 17/582,649, Response filed Nov. 3, 2022 to Non Final Office Action dated Aug. 4, 2022", 8 pgs.
"European Application Serial No. 20190285.5, Extended European Search Report dated Nov. 3, 2020", 6 pgs.
"International Application Serial No. PCT/US2021/039796, International Search Report dated Aug. 11, 2021", 5 pgs.
"International Application Serial No. PCT/US2021/039796, Written Opinion dated Aug. 11, 2021", 6 pgs.
"International Application Serial No. PCT/US2021/039796, International Preliminary Report on Patentability dated Jan. 12, 2023", 8 pgs.
"Korean Application Serial No. 10-2023-7003943, Notice of Preliminary Rejection dated May 30, 2023", (w/ English Translation), 9 pgs.
"Korean Application Serial No. 10-2023-7003943, Response filed Jul. 26, 2023 to Notice of Preliminary Rejection dated May 30, 2023", with English claims, 12 pages.
"Japanese Application Serial No. 2023-500019, Notification of Reasons for Rejection dated Jun. 20, 2023", with English translation, 9 pages.
"European Application Serial No. 21742660.0, Response to Communication pursuant to Rules 161(1) and 162 EPC filed Aug. 7, 2023", 56 pgs.
"Chinese Application Serial No. 202180053976.3, Office Action dated Sep. 9, 2023", with English translation, 20 pages.
"Japanese Application Serial No. 2023-500019, Response filed Sep. 15, 2023 to Notification of Reasons for Rejection dated Jun. 20, 2023", with English translation, 13 pages.

* cited by examiner

INTEGRATED OPTICAL SYSTEM FOR DYNAMIC DIFFUSE AND DIRECTIONAL LIGHTING

CROSS-REFERENCE TO RELATED APPLICATION

This application is a continuation of U.S. patent application Ser. No. 17/582,649, filed on Jan. 24, 2022, which is a continuation of U.S. patent application Ser. No. 17/020,390, filed on Sep. 14, 2020, which claims the benefit of U.S. Provisional Application No. 63/047,631, filed Jul. 2, 2020, which are hereby incorporated by reference in their entireties.

FIELD OF THE DISCLOSURE

The present disclosure relates generally to an illumination system that can produce a dynamically variable illumination pattern.

BACKGROUND OF THE DISCLOSURE

It is challenging for an illumination system to produce a dynamically variable illumination pattern. For example, it can be difficult to achieve both a wide beam angle and a suitable resolution over the wide beam angle.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

An illumination system can produce a dynamically variable illumination pattern. The illumination system can include a light guide, which can optionally be a planar light guide.

The illumination system can include projection optics that are coupled to the light guide. The projection optics can contribute to the illumination pattern at relatively low beam angles (i.e., beam angles formed with respect to a surface normal of the light guide). A light source of the projection optics can include individually addressable light-emitting diodes. At least some of the light-emitting diodes can be arranged in an array, such as a pixilated rectangular array and/or a pixilated linear array. At least some of the light-emitting diodes can be formed discretely (i.e., may not be included as part of an array). The light-emitting diodes can direct light through one or more focusing elements, such as a lens that is separate from the light guide and/or one or more refracting elements and/or reflecting elements that are formed integrally with one or more respective surfaces of the light guide. A controller can selectively power one or more individual light-emitting diodes. By controlling which light-emitting diodes are powered, the controller can therefore control the illumination pattern contribution from the projection optics.

The light guide can also include scattering features. The scattering features can direct light out of the light guide over a relatively large surface area, which can help reduce glare when the light guide is viewed directly.

Figure 1:
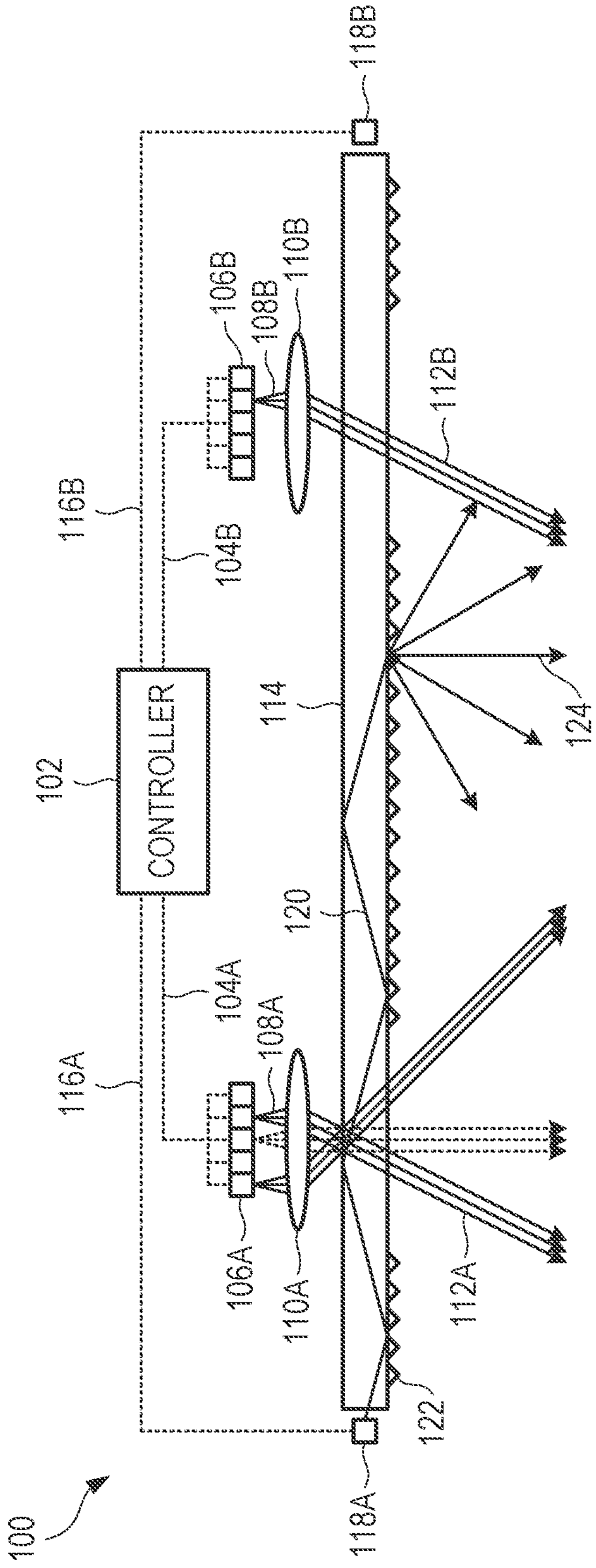
FIG. 1 shows a side view of an example of an illumination system, in accordance with some embodiments.

FIG. 1 shows a side view of an example of an illumination system 100, in accordance with some embodiments.

The illumination system 100 can include a light guide 114. The light guide 114 can be formed from a substantially transparent material, such as glass or plastic. The light guide 114 can be configured to guide light from one location in the light guide 114 to another location in the light guide 114. The light guide 114 can be shaped such that light rays inside the light guide 114 are reflected at one or more surfaces of the light guide 114 via, for example, total internal reflection.

The light guide 114 can have a first surface and a second surface opposite the first surface. The light guide 114 can be shaped as a substantially planar light guide 114, with the second surface being substantially parallel to the first surface. The light guide 114 can be shaped as a wedged light guide 114, with the second surface being angled with respect to the first surface. Other suitable shapes can also be used.

Figure 6:
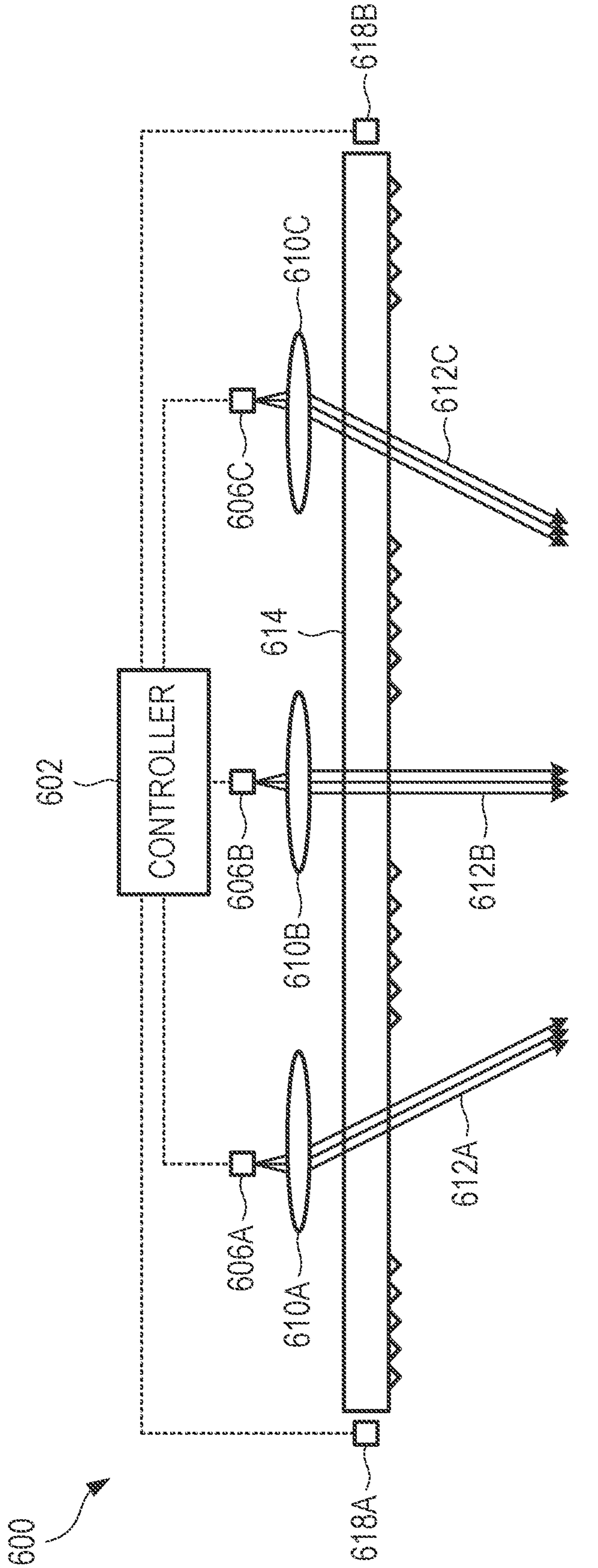
FIG. 6 shows a side view of another example of an illumination system, in accordance with some embodiments.

A plurality of first individually addressable light-emitting diodes 106A, 106B can direct first light 108A, 108B into the light guide 114 through the first surface of the light guide 114. The plurality of individually addressable light-emitting diodes 106A, 106B can be formed as one or more arrays of light-emitting diodes 106A, 106B. Each array of light-emitting diodes 106A, 106B can have electrical connections that allow each light-emitting diode in the array to be individually addressable. Alternatively, one or more of the individually addressable light-emitting diodes 106A, 106B can be formed discretely (e.g., not included as part of an array). FIG. 6, discussed below, shows an example of such a discretely formed light-emitting diode.

Returning to FIG. 1, focusing optics 110A, 110B can at least partially focus the first light 108A, 108B to emerge from the light guide 114 through the second surface of the light guide 114 as projected light 112A, 112B. In the example of FIG. 1, the focusing optics 110A, 110B can collimate the first light 108A, 108B, such that the projected light 112A, 112B can emerge as being collimated or substantially collimated. Alternatively, the focusing optics 110A, 110B can at least partially focus the first light 108A, 108B to form exiting light, where the exiting light is diverging and has a divergence angle that is smaller than a divergence angle of light emitted from the light-emitting diodes 106A, 106B. As a further alternative, the focusing optics 110A, 110B can at least partially focus the first light 108A, 108B to form exiting light, where the exiting light is converging to a focus and then diverging thereafter, and, in divergence, has a divergence angle that is smaller than a divergence angle of light emitted from the light-emitting diodes 106A, 106B.

The focusing optics 110A, 110B can be formed as refractive projection optics, which can project light from the plurality of first individually addressable light-emitting diodes into a far field in a substantially imaging fashion. For example, a position of a particular light-emitting diode can correlate with an angle in the far field at which light from the light-emitting diode emerges. In some examples, most or all of the projected light 112A, 112B (defined as projected light 112A, 112B having an intensity greater than or equal to half of a peak intensity) can fall within a range of propagation angles (being defined with respect to a surface normal of the second surface of the light guide 114). In some examples, the range of propagation angles can be between about 30 degrees and about 60 degrees. For example, for a range of propagation angles of about 30 degrees, measured with respect to the surface normal, the projected light can fall between about negative 30 degrees and about positive 30 degrees, measured with respect to the surface normal. Other numerical examples are also possible. Other suitable angular ranges can also be used.

At least one second light-emitting diode can direct second light into the light guide 114 as guided light 120 that is guided between the first surface of the light guide 114 and the second surface of the light guide 114. For example, the second light-emitting diode can be located along an edge of the light guide 114 and can direct the second light into the light guide 114 through the edge of the light guide 114. Alternatively, the second light-emitting diode can be located proximate an edge of the light guide 114 and can couple second light into the light guide 114 via the first or second surfaces of the light guide 114. For configurations in which the illumination system 100 includes multiple second light-emitting diodes, the second light-emitting diodes can be spaced apart along one or more edges of the light guide 114 and may be oriented such that their respective emissions may not be parallel to one other. In other words, an emission of one second light-emitting diode can be angled with respect to an emission of another second light-emitting diode. One or more second light-emitting diodes can be included in an array or can be formed discretely.

A plurality of light-extraction features 122 can be disposed on the light guide 114. The light-extraction features 122 can direct at least some of the guided light 120 out of the light guide 114 through the second surface of the light guide 114 as scattered light 124. The light-extraction features 122 can be distributed over a relatively large area of the light guide 114. Such a distribution over a relatively large area can produce a relatively low, relatively uniform luminance to the scattered light 124. This relatively low, relatively uniform luminance can reduce glare, when, for example, a user directly views the output of the illumination system 100. The light-extraction features 122 can include a roughened surface, such as a diffuser, a plurality of relatively small shaped structures, such as prisms or microprisms that can be embossed or injection molded, a plurality of absorbing or scattering elements, such as dots of scattering ink that can be screen printed or inkjet printed, and/or other light-scattering elements. The first surface of the light guide 114 can optionally include a reflector that can direct the scattered light 124 away from the first surface and toward the second surface of the light guide 114. One or more of the light-extraction features 122 can be disposed on the second surface of the light guide 114, as shown in the example of FIG. 1. One or more of the light-extraction features 122 can be disposed on the first surface of the light guide 114. One or more of the light-extraction features 122 can be disposed in an interior of the light guide 114. The light-extraction features 122 can be absent in regions of the first surface of the light guide 114 and regions of the second surface of the light at which the projected light 112A, 112B can propagate. The light-extraction features 122 can be absent in the region of the reflector.

A controller 102 can electrically control, via a first electrical connection 104A and a second electrical connection 104B, the plurality of first individually addressable light-emitting diodes, such as to determine which of the light-emitting diodes are turned on or off. As used herein, the term "electrical connection" may be, for example, a hardwired connection or a remotely coupled connection (e.g., a wireless connection). By changing which of the first individually addressable light-emitting diodes 106A, 106B are electrically powered, the controller 102 can change an angular output of the projected light 112A, 112B. For example, if the controller 102 powers a first light-emitting diode of the plurality, the projected light 112A, 112B can have an angular output having a first width. If the controller 102 powers the first light-emitting diode of the plurality and an adjacent second light-emitting diode of the plurality, the projected light 112A, 112B can have an angular output having a second width that is, for example, twice the first width. Other suitable examples can also be used. In this manner, the controller 102 can allow a user to tailor a beam shape and/or a beam direction of a light output of the illumination system 100. The controller 102 can perform the controlling via, for example, routing to a central microcontroller, passive/active matrix addressing, and/or addressing of integrated switches over a common data line through a digital communication protocol (not shown in FIG. 1 but understandable to a person of ordinary skill in the art upon reading and understanding the disclosed subject matter). In some examples, the controller 102 can receive input from the user, such as via a user interface, to select the beam shape and/or beam direction. In some examples, the input can include a selection of one of a predefined or specified plurality of configurations. In some examples, the controller 102 can receive one or more inputs to determine a desired light distribution. The inputs can include occupant location and activity, time of day, ambient lighting, and others. Suitable sensors may be connected to or integrated into the control system to provide input.

The controller 102 can also electrically control, via 116A and 116B, the at least one second light-emitting diode 118A, 118B. In some examples, the controller 102 can allow selection of a configuration of the projected light 112A, 112B (resulting from control of the plurality of first individually addressable light-emitting diodes 106A, 106B), but not allow selection of a configuration of the second light-emitting diode(s) 118A, 118B. In this manner, the projected light 112A, 112B can be controlled, such as by a user, but the scattered light 124 may not be controllable by the user. By allowing control of the light output in this manner, the illumination system 100 can allow relatively high resolution of the light output in the projected light 112A, 112B, while achieving a relatively wide angular output by addition of the scattered light 124 to the projected light 112A, 112B.

As a result of the aforementioned embodiments, the illumination system 100 can combine projected light 112A, 112B, which can have beam propagation directions relatively close to a surface normal of the second surface of the light guide 114 (e.g. relatively small propagation angles, such as less than about 40 degrees, less than about 50 degrees, less than about 60 degrees, or others), with scattered light 124, which can include beam propagation directions relatively far from the surface normal of the second surface of the light guide 114 (e.g. relatively large propagation angles, greater than about 40 degrees, greater than about 50 degrees, greater than about 60 degrees, or others). The projection optics can project a digitally addressable high-luminance LED source for beam shaping and steering at angles that can be substantially outside direct view for users. The scattering optics can be designed such that light is mainly scattered towards higher angles that may be in direct view and can be distributed over a larger area to reduce luminance contrast and associated glare.

Figure 2:
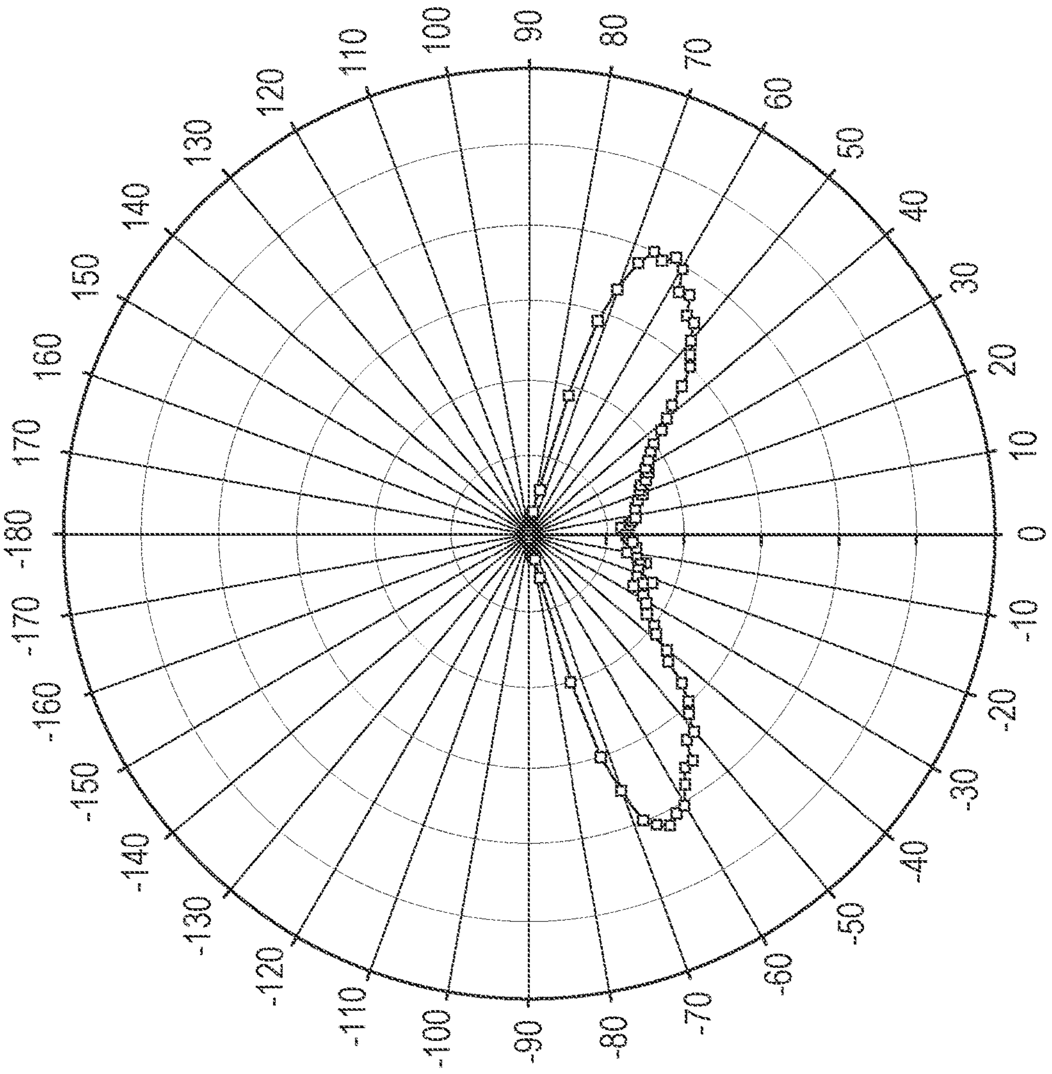
FIG. 2 shows a polar plot of an example of a distribution of the scattered light of the illumination system of FIG. 1, in accordance with some embodiments.

FIG. 2 shows a polar plot of an example of a distribution of the scattered light 124 of the illumination system 100 of FIG. 1, in accordance with some embodiments. In the polar plot of FIG. 2, angles are formed with respect to a surface normal of the second surface of the light guide 114. For example, an angle of zero degrees coincides with the surface normal, while an angle of positive 90 degrees or negative 90 degrees is essentially parallel to the second side of the light guide 114.

In the example of FIG. 2, the scattered light distribution is bifurcated, having a first peak separate from a second peak. Such a bifurcated light distribution can be referred to as a batwing distribution. In the example of FIG. 2, the first peak lies between negative 70 degrees and negative 60 degrees, and the second peak lies between positive 60 degrees and positive 70 degrees. Other numerical ranges can also be used.

Figure 3:
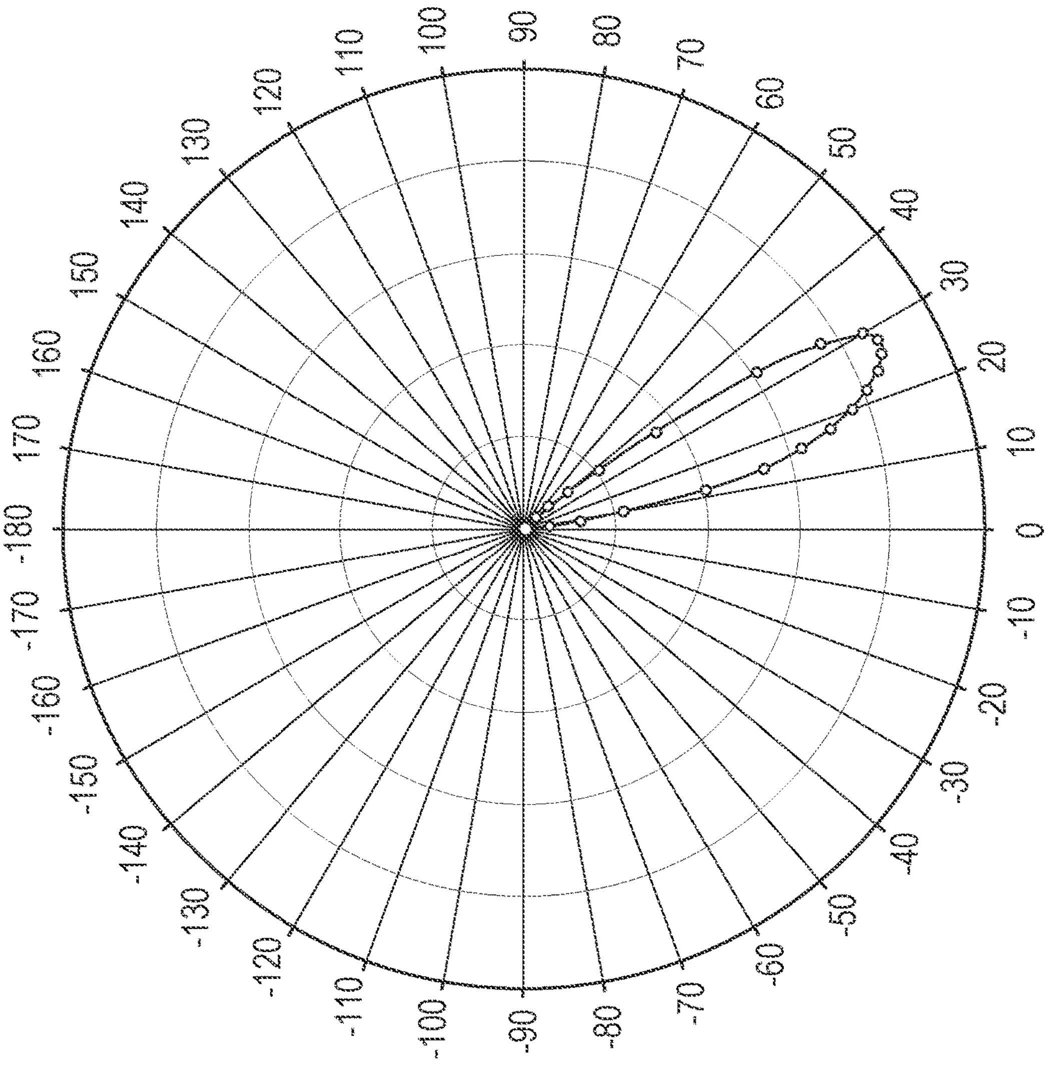
FIG. 3 shows a polar plot of an example of a distribution of the projected light of the illumination system of FIG. 1, in accordance with some embodiments.

FIG. 3 shows a polar plot of an example of a distribution of the projected light 112A, 112B of the illumination system 100 of FIG. 1, in accordance with some embodiments. In the polar plot of FIG. 3, angles are formed with respect to the surface normal of the second surface of the light guide 114.

In the example of FIG. 3, the scattered light distribution is relatively sharply peaked, having a single peak. In the example of FIG. 3, the single peak lies between positive 20 degrees and positive 30 degrees. Other numerical ranges can also be used.

The single peak can correspond to a light from a single light-emitting diode. The projected light distribution from each light-emitting diode can have a width similar to the width shown in FIG. 3, but angularly offset from the distribution shown in FIG. 3. By controlling which light-emitting diodes are powered concurrently, the controller 102 can effectively combine the individual projected light distributions that correspond to the light-emitting diodes that are powered. For example, the controller 102 can move the relatively narrow peak to another angle by electrically powering another light-emitting diode at a different location. As another example, the controller 102 can widen the angular output by electrically powering multiple light-emitting diodes, optionally at contiguous locations.

In the configuration of FIG. 1, the focusing optics 110A, 110B include lenses that are formed separately from the light guide 114, such that the output of the lenses propagates through the first surface of the light guide and the second surface of the light guide without any focusing or decollimating effects being imparted by the generally planar first and second surfaces of the light guide 114. Other configurations for the focusing optics are possible, including integrating the focusing optics into the first and/or second surfaces of the light guide 114.

Figure 4:
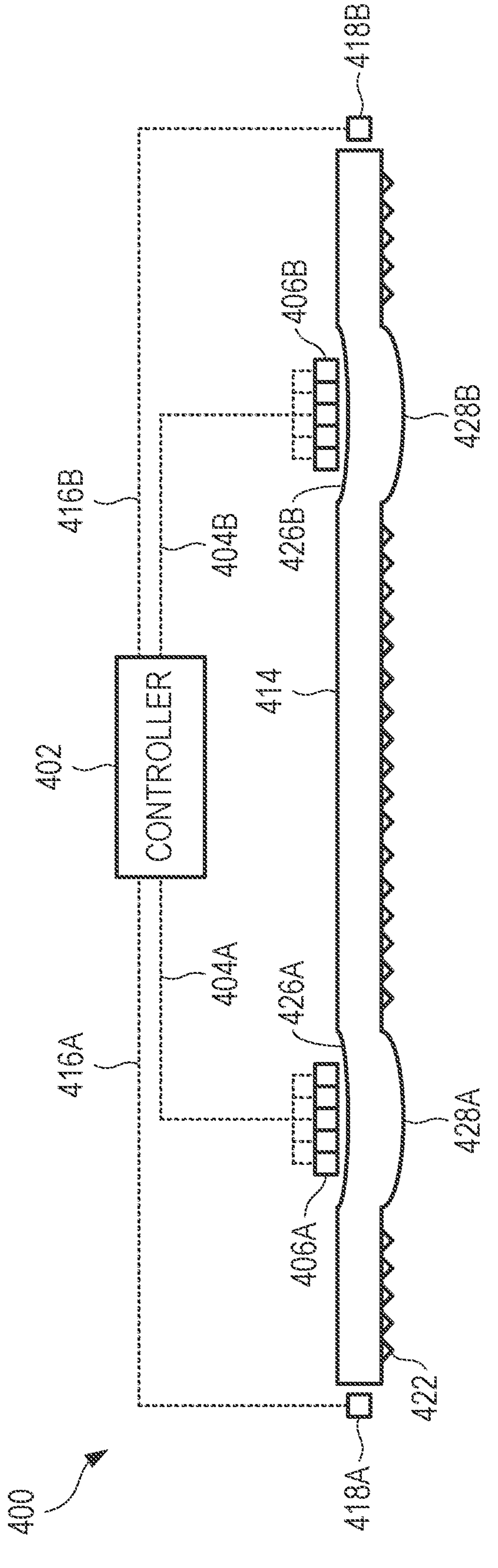
FIG. 4 shows a side view of another example of an illumination system, in accordance with some embodiments.

FIG. 4 shows a side view of another example of an illumination system 400, in accordance with some embodiments. Elements 402-422 of FIG. 4 are the same as or similar respective functions and structures of corresponding elements 102-122 of FIG. 1.

Focusing optics 426A, 428A, 426B, 428B can be formed as respectively shaped portions (e.g., curved portions) of the first and second surfaces of the light guide 414. For example, focusing optics 426A and 428A can at least partially focus the light emitted from light-emitting diode array 406A, and focusing optics 426B and 428B can at least partially focus the light emitted from light-emitting diode array 406B. Other suitable configurations are possible. In this manner, the focusing optics can be integrated with the light guide 414. Any or all of the shaped portions can be used instead of or in addition to any of the lenses shown in FIG. 1.

In the configuration of FIG. 4, the light-emitting diodes that generate the scattered light are located along one or more edges of the light guide. Other configurations are possible for these light-emitting diodes that generate the scattered light, including locating them alongside the light-emitting diodes that generate the projected light.

Figure 5:
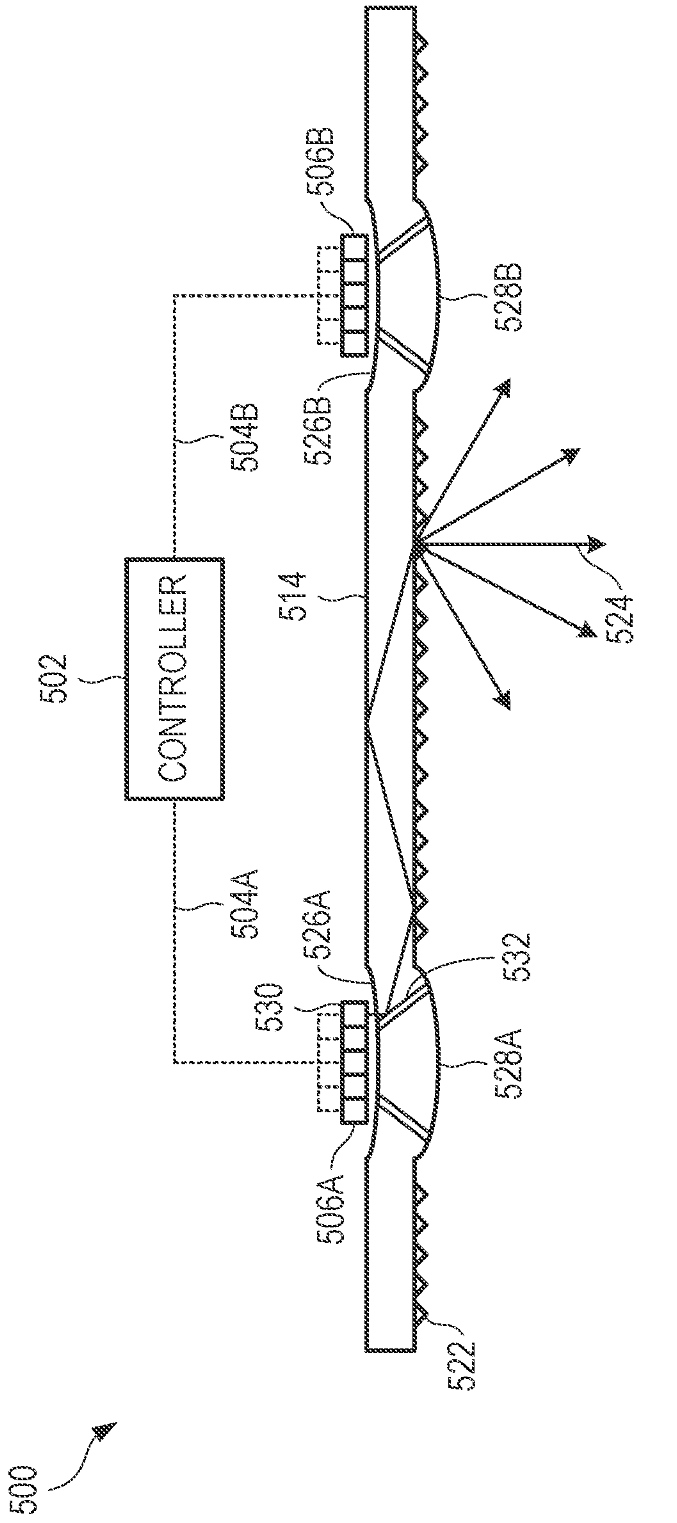
FIG. 5 shows a side view of another example of an illumination system, in accordance with some embodiments.

FIG. 5 shows a side view of another example of an illumination system 500, in accordance with some embodiments. Elements 502-528 of FIG. 5 are the same as or similar respective functions and structures of corresponding elements 402-428 of FIG. 4.

The array 506A of light-emitting diodes can include one or more light-emitting diodes 530 at its periphery, which can generate light that is directed to the light-extraction features 522 to form the scattered light 524. Other arrays of light-emitting diodes, such as 506B, can include similar light-emitting diodes 530 at their respective peripheries, which can similarly generate the light that forms the scattered light 524. Light from the interior light-emitting diodes of the array can form the projected light.

A reflector 532 can split off light from the light-emitting diode 530 and direct the light into the light guide 514 as guided light. The light-extraction features 522 can direct at least some of the guided light out of the light guide 514 through the second surface of the light guide 514 as scattered light 524. The reflector 532 can be formed as a discontinuity between adjacent portions of the light guide 514. The reflector 532 can reflect via, for example, total internal reflection or can include one or more reflective and/or dielectric layers that can reflect the light into the light guide 514.

In some examples, the reflector 532 can extend around a perimeter of the array 506A of light-emitting diodes, so as to direct light from multiple peripherally located light-emitting diodes from the array 506A into the light guide 514 as guided light and out of the light guide 514 as scattered light.

In the configurations of FIGS. 1, 4, and 5, the light-emitting diodes are arranged in one or more arrays. Other configurations are possible for the light-emitting diodes, including using discretely formed light-emitting diodes.

FIG. 6 shows a side view of another example of an illumination system 600, in accordance with some embodiments. The configuration of FIG. 6 uses discretely formed light-emitting diodes, rather than arrays of light-emitting diodes.

In the configuration of FIG. 6, a controller 602 can control a light-emitting diode 606A, which can emit light into focusing optics 610A to produce projected light 612A. The controller 602 can further control a light-emitting diode 606B, which can emit light into focusing optics 610B to produce projected light 612B. The controller 602 can further control a light-emitting diode 606C, which can emit light into focusing optics 610C to produce projected light 612C. The projected lights 612A, 612B, and 612C can optionally be angled with respect to one another. Each of the focusing optics 610A, 610B, 610C can be formed as an individual lens or can optionally be formed integrally with the light guide 614, as shown in FIGS. 4 and 5.

The controller 602 can additionally control light-emitting diodes 618A and 618B, which can direct light into the light guide 614 to form the scattered light.

Figure 7:
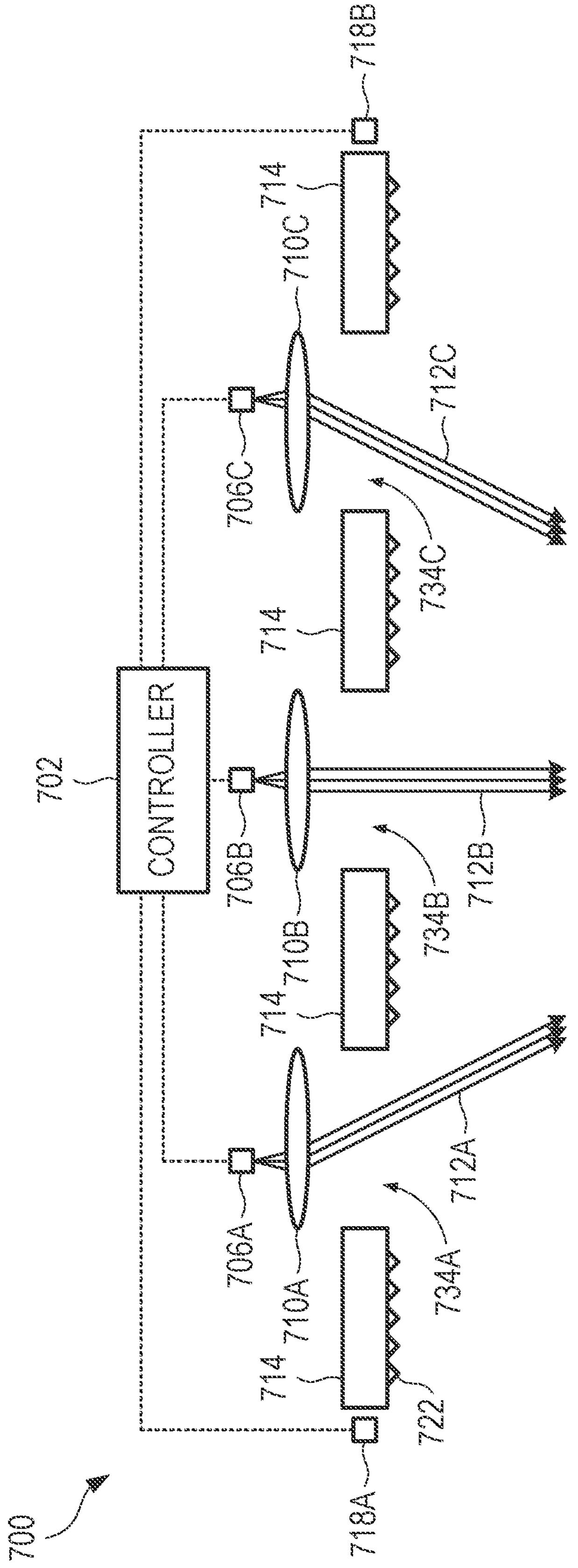
FIG. 7 shows a side view of another example of an illumination system, in accordance with some embodiments.

FIG. 7 shows a side view of another example of an illumination system 700, in accordance with some embodiments. The illumination system 700 differs from the configurations in FIGS. 1 and 4-6 in that the projected light 712A, 712B, 712C can pass through one or more holes 734A, 734B, 734C in the light guide 714. For example, the projected light 712A, 712B, 712C can propagate through air after exiting the focusing optics 710A, 710B, 710C, without entering the light guide 714 through the first surface, passing through an interior of the light guide 714, and exiting the light guide 714 at the second surface.

In the configuration of FIG. 7, a controller 702 can control a light-emitting diode 706A, which can emit light into focusing optics 710A to produce projected light 712A. The controller 702 can further control a light-emitting diode 706B, which can emit light into focusing optics 710B to produce projected light 712B. The controller 702 can further control a light-emitting diode 706C, which can emit light into focusing optics 710C to produce projected light 712C. The projected lights 712A, 712B, and 712C can optionally be angled with respect to one another.

The illumination system 700 can include a light guide 714 having a first surface and a second surface opposite the first surface. The light guide 714 can define a hole, such as 734A, 734B, 734C, that extends through the light guide 714 from the first surface to the second surface. A first light-emitting diode, such as 706A, 706B, 706C, can emit first light. Focusing optics, such as 710A, 710B, 710C, can at least partially focus the first light and direct the at least partially focused first light through the corresponding hole 734A, 734B, 734C in the light guide 714 to emerge from the hole 714 at the second surface of the light guide 714 as projected light. A second light-emitting diode, such as 718A, 718B, can direct second light into the light guide 714 as guided light that can be guided between the first surface and the second surface.

In some examples, the focusing optics, such as lenses 710A, 710B, 710C, can be located external to the light guide 714, such that the at least partially focused first light enters the corresponding hole 734A, 734B, 734C at the first surface of the light guide 714. In some examples, the focusing optics, such as lenses 710A, 710B, 710C, can be located at least partially within the respective hole 734A, 734B, 734C. In some examples in which the focusing optics is at least partially within a hole, the focusing optics can be recessed within the hole by an amount that can create a cut-off for light beyond an intended projection angle that might otherwise cause glare for a viewer.

In some examples, one or more of the holes 734A, 734B, 734C can be substantially cylindrical. For example, one or more of the holes 734A, 734B, 734C can extend along a hole axis, and can have a substantially circular cross-section, taken in a plane orthogonal to the hole axis. In some examples, the hole axis can be substantially orthogonal to the second surface of the light guide. In some examples, in which there are multiple holes 734A, 734B, 734C extending through the light guide 714, two or more of the corresponding hole axes can be substantially parallel. In some examples, in which there are multiple holes 734A, 734B, 734C extending through the light guide 714, two or more of the corresponding hole axes can be angled with respect to each other.

In some examples, the illumination system 700 can include a plurality of light-extraction features 722 that can direct at least some of the guided light out of the light guide 714 through the second surface of the light guide 714 as scattered light.

Although the illumination system 700 is shown in FIG. 7 as using discretely formed light-emitting diodes, similar to those shown in FIG. 6, the configuration can also use one or more arrays of light-emitting diodes, similar to those shown in FIGS. 1, 4, and 5, or a combination of at least one discretely formed light-emitting diode and at least one array of light-emitting diodes.

Further, an illumination system can optionally mix configurations of the focusing optics and the light guide. For example, an illumination system can include one or more focusing optics formed separate from the light guide and configured to direct light into and out of the light guide as in FIGS. 1 and 6, one or more focusing optics formed integrally with the light guide as in FIGS. 4 and 5, and/or one or more focusing optics formed separate from the light guide and configured to direct light through a hole in the light guide, as in FIG. 7.

In some examples, in combination with any of the above configurations, the scattering elements can optionally be divided into zones. Each zone can produce a different output light distribution. The light-emitting diodes can be individually addressable for each zone. For example, the zones can have a same or similar polar angular distribution but different azimuthal angular distributions. In this manner, the illumination system can effectively steer the scattered light. Because the scattered light can extend over a wide angular range, this arrangement can effectively allow beam steering over the wide angular range.

In some examples, in combination with any of the above configurations, the projected light and/or the scattered light can be made tunable in color, by coupling at least two different primary light-emitting diodes into the respective optics that can be separately addressed. Color tuning in this manner can support functionalities like dim-to-warm, white correlated color temperature tuning, or full color tuning. In addition, light guide plates and scattering elements can provide good color mixing, which can help avoid or eliminate visualizing the individual color contributions from the individual light-emitting diodes.

In projection optics, there are several options that can help ensure that the different primary colors have the same light distribution in the far field, so as to maintain substantial color uniformity in the far field.

For example, multiple colors may can be implemented in a single pixilated light source, such as an array of light-emitting diodes. An optional mixing optic or optics, such as a scattering layer, can mix the colors prior to the light being projected. Because the mixing optic can reduce a spatial resolution of the pixilated light source, a practical design can typically trade off between color mixing and spatial resolution.

As another example, multiple colors may be implemented as separate pixilated sources, with each source having only one color. If the projection optics produce beams that traverse similar paths in the far field, such as by being parallel to one another, then colors can mix in the far field. The layout of the pixilated sources relative to each other can minimize or reduce color shadows.

As still another example, for configurations in which the light-emitting diodes are in a sparse array or are discrete, color mixing in the far field can also be achieved if the collective light distribution of the projection optics for a color is the same for all the colors.

In some examples, the light-emitting diodes that form the scattered light can have a higher correlated color temperature (CCT) than the light-emitting diodes that form the projected light. For example, the scattered light can have a correlated color temperature of about 5000K or higher, while the projected light can have a correlated color temperature between about 2700K and about 4000K. Distributing the correlated color temperatures in this manner can help support a human-centric lighting design. For example, in an overhead lighting fixture, distributing the correlated color temperatures in this manner can deliver blue-rich light directly to the eye for circadian entrainment and other physiological benefits, while providing functional neutral or warm white downward directed light for illumination. The higher correlated color temperature light-emitting diodes can optionally be dimmed or turned off in the evening to reduce melatonin suppression while keeping the functional illumination provided by the lower correlated color temperature light-emitting diodes.

In some examples, the light-emitting diodes that form the scattered light can be tunable in correlated color temperature, while the light-emitting diodes that form the projected light can be fixed in correlated color temperature. In addition to helping support the human-centric lighting design discussed above, allowing the scattered light to be tunable in correlated color temperature can allow for scene setting and/or physiological benefits.

The illumination system can be formed as a dynamic lighting system, which can be used for indoor lighting, such as for hospitality, retail, office lighting, and other applications.

Figure 8:
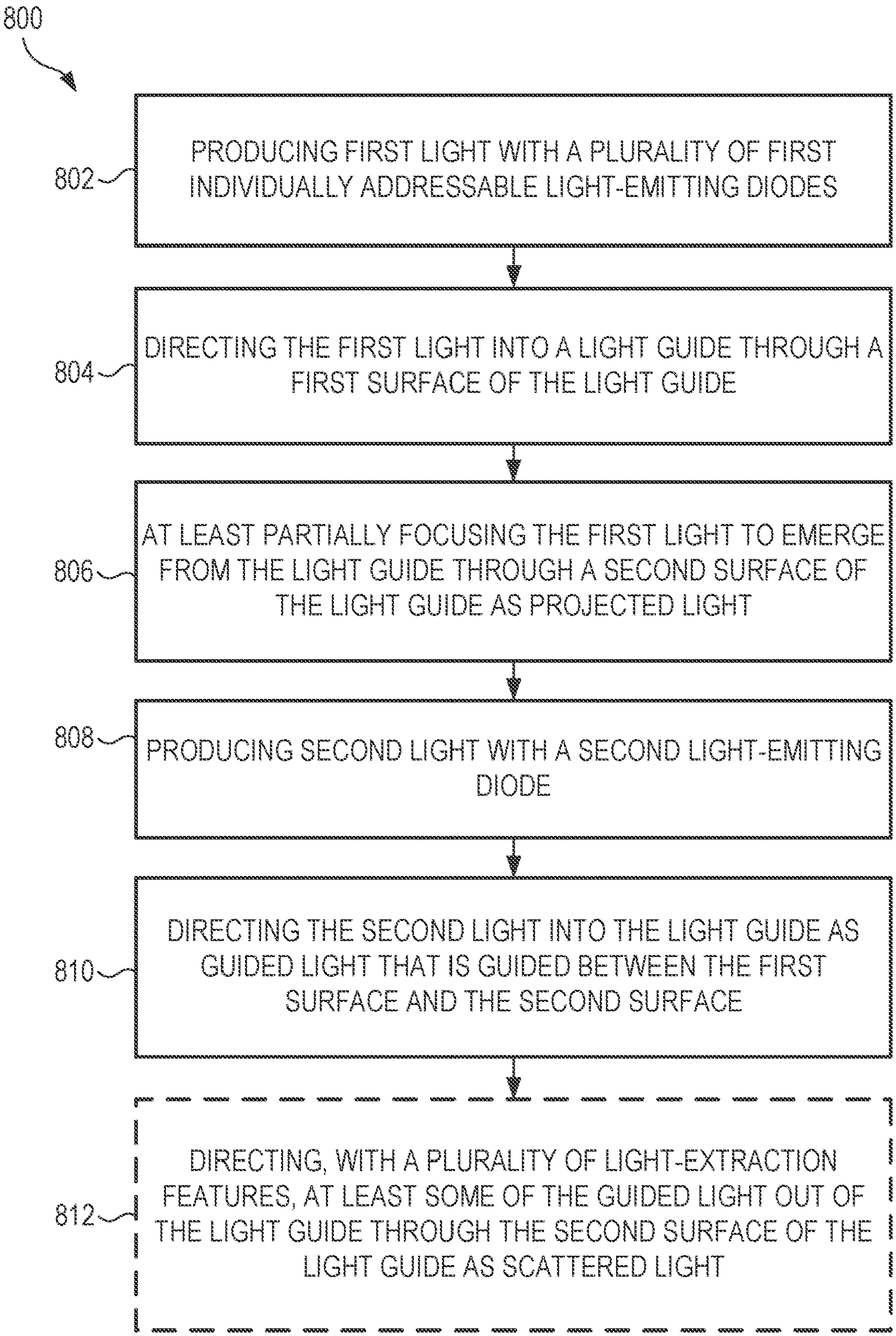
FIG. 8 shows an example of a method for producing illumination, in accordance with some embodiments.

FIG. 8 shows an example of a method 800 for producing illumination, in accordance with some embodiments. The method 800 can be executed on the illumination systems shown in FIGS. 1 and 4-7, or on other suitable illumination systems.

At operation 802, the method 800 can produce first light with a plurality of first individually addressable light-emitting diodes.

At operation 804, the method 800 can direct the first light into a light guide through a first surface of the light guide.

At operation 806, the method 800 can at least partially focus the first light, with focusing optics, to emerge from the light guide through a second surface of the light guide as projected light, the second surface of the light guide being opposite the first surface of the light guide.

At operation 808, the method 800 can produce second light with a second light-emitting diode.

At operation 810, the method 800 can direct the second light into the light guide as guided light that is guided between the first surface and the second surface.

At optional operation 812, the method 800 can direct, with a plurality of light-extraction features, at least some of the guided light out of the light guide through the second surface of the light guide as scattered light.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

To further illustrate the systems and related methods disclosed herein, a non-limiting list of examples is provided below. Each of the following non-limiting examples can stand on its own or can be combined in any permutation or combination with any one or more of the other examples.

In Example 1, an illumination system can include: a light guide having a first surface and a second surface opposite the first surface; a plurality of first individually addressable light-emitting diodes configured to direct first light into the light guide through the first surface of the light guide; focusing optics configured to at least partially focus the first light to emerge from the light guide through the second surface of the light guide as projected light; and a second light-emitting diode configured to direct second light into the light guide as guided light that is guided between the first surface and the second surface.

In Example 2, the illumination system of Example 1 can optionally further include a plurality of light-extraction features configured to direct at least some of the guided light out of the light guide through the second surface of the light guide as scattered light.

In Example 3, the illumination system of any one of Examples 1-2 can optionally further include a controller configured to electrically control the plurality of first individually addressable light-emitting diodes.

In Example 4, the illumination system of any one of Examples 1-3 can optionally be configured such that the controller is further configured to electrically power one of a plurality of specified subsets of light-emitting diodes of the plurality of first individually addressable light-emitting diodes.

In Example 5, the illumination system of any one of Examples 1~4 can optionally be configured such that the controller is further configured to receive input that specifies which of the plurality of specified subsets is to be electrically powered.

In Example 6, the illumination system of any one of Examples 1-5 can optionally be configured such that: the plurality of first individually addressable light-emitting diodes includes a first light-emitting diode; and the focusing optics includes a first lens positioned in a first optical path between the first light-emitting diode and the first surface of the light guide.

In Example 7, the illumination system of any one of Examples 1-6 can optionally be configured such that: the plurality of first individually addressable light-emitting diodes further includes a second light-emitting diode positioned away from the first light-emitting diode; and the focusing optics includes a second lens positioned in a second optical path between the second light-emitting diode and the first surface of the light guide.

In Example 8, the illumination system of any one of Examples 1-7 can optionally be configured such that: the plurality of first individually addressable light-emitting diodes includes a first light-emitting diode; and the focusing optics includes a first curved portion disposed on the first surface of the light guide and a second curved portion disposed on the second surface of the light guide, the first and second curved portions configured to at least partially focus light emitted from the first light-emitting diode.

In Example 9, the illumination system of any one of Examples 1-8 can optionally be configured such that: the plurality of first individually addressable light-emitting diodes further includes a second light-emitting diode positioned away from the first light-emitting diode; and the focusing optics includes a third curved portion disposed on the first surface of the light guide and a fourth curved portion disposed on the second surface of the light guide, the third and fourth curved portions configured to at least partially focus light emitted from the second light-emitting diode.

In Example 10, the illumination system of any one of Examples 1-9 can optionally be configured such that the second light-emitting diode is spaced apart from the plurality of first individually addressable light-emitting diodes and configured to direct the second light into an edge of the light guide, the edge extending between the first and second surfaces of the light guide.

In Example 11, the illumination system of any one of Examples 1-10 can optionally be configured such that the plurality of first individually addressable light-emitting diodes includes at least two light-emitting diodes that emit light having different correlated color temperatures.

In Example 12, the illumination system of any one of Examples 1-11 can optionally further include a third light-emitting diode configured to direct third light into the light guide as guided light that is guided between the first surface and the second surface, the second light and the third light having different correlated color temperatures.

In Example 13, the illumination system of any one of Examples 1-12 can optionally be configured such that the plurality of light-extraction features are disposed on the second surface of the light guide.

In Example 14, a method for providing illumination can include: producing first light with a plurality of first individually addressable light-emitting diodes; directing the first light into a light guide through a first surface of the light guide; at least partially focusing the first light, with focusing optics, to emerge from the light guide through a second surface of the light guide as projected light, the second surface of the light guide being opposite the first surface of the light guide; producing second light with a second light-emitting diode; directing the second light into the light guide as guided light that is guided between the first surface and the second surface; directing, with a plurality of light-extraction features, at least some of the guided light out of the light guide through the second surface of the light guide as scattered light.

In Example 15, the method of Example 14 can optionally further include: receiving input that specifies a first subset of a plurality of specified subsets of plurality of first individually addressable light-emitting diodes; and electrically powering the first subset of the plurality of first individually addressable light-emitting diodes.

In Example 16, an illumination system can include: a light guide having a first surface and a second surface opposite the first surface, the light guide defining a hole extending through the light guide from the first surface to the second surface; a first light-emitting diode configured to emit first light; focusing optics configured to at least partially focus the first light and direct the first light through the hole in the light guide to emerge from the hole at the second surface of the light guide as projected light; and a second light-emitting diode configured to direct second light into the light guide as guided light that is guided between the first surface and the second surface.

In Example 17, the illumination system of Example 16 can optionally be configured such that the focusing optics is located external to the light guide, such that the at least partially focused first light enters the hole at the first surface of the light guide.

In Example 18, the illumination system of any one of Examples 16-17 can optionally be configured such that the hole is substantially cylindrical.

In Example 19, the illumination system of any one of Examples 16-18 can optionally be configured such that the hole extends along a hole axis that is substantially orthogonal to the second surface of the light guide.

In Example 20, the illumination system of any one of Examples 16-19 can optionally further include a plurality of light-extraction features configured to direct at least some of the guided light out of the light guide through the second surface of the light guide as scattered light.

In Example 21, an illumination system can include: a light guide having a first surface and a second surface opposite the first surface; a plurality of first individually addressable light-emitting diodes configured to direct first light into the light guide through the first surface of the light guide; a controller configured to electrically control the plurality of first individually addressable light-emitting diodes; focusing optics configured to at least partially focus the first light to emerge from the light guide through the second surface of the light guide as projected light; a second light-emitting diode configured to direct second light into the light guide as guided light that is guided between the first surface and the second surface; and a plurality of light-extraction features disposed on the second surface of the light guide and configured to direct at least some of the guided light out of the light guide through the second surface of the light guide as scattered light.

In Example 22, the illumination system of Example 21 can optionally be configured such that the controller is further configured to: electrically power one of a plurality of specified subsets of light-emitting diodes of the plurality of first individually addressable light-emitting diodes; and receive input that specifies which of the plurality of specified subsets is to be electrically powered.

In Example 23, the illumination system of any one of Examples 21-22 can optionally be configured such that: the plurality of first individually addressable light-emitting diodes includes a first light-emitting diode; the focusing optics includes a first lens positioned in a first optical path between the first light-emitting diode and the first surface of the light guide; the plurality of first individually addressable light-emitting diodes further includes a second light-emitting diode positioned away from the first light-emitting diode; and the focusing optics includes a second lens positioned in a second optical path between the second light-emitting diode and the first surface of the light guide.

In Example 24, the illumination system of any one of Examples 21-23 can optionally be configured such that: the plurality of first individually addressable light-emitting diodes includes a first light-emitting diode; the focusing optics includes a first curved portion disposed on the first surface of the light guide and a second curved portion disposed on the second surface of the light guide, the first and second curved portions configured to at least partially focus light emitted from the first light-emitting diode; the plurality of first individually addressable light-emitting diodes further includes a second light-emitting diode positioned away from the first light-emitting diode; and the focusing optics includes a third curved portion disposed on the first surface of the light guide and a fourth curved portion disposed on the second surface of the light guide, the third and fourth curved portions configured to at least partially focus light emitted from the second light-emitting diode.

In Example 25, the illumination system of any one of Examples 21-24 can optionally be configured such that the second light-emitting diode is spaced apart from the plurality of first individually addressable light-emitting diodes and configured to direct the second light into an edge of the light guide, the edge extending between the first and second surfaces of the light guide.

What is claimed is:

1. An illumination system, comprising:

a light guide having a first surface and a second surface opposite the first surface, the first surface configured to receive first light and direct the first light into the light guide through the first surface of the light guide, the light guide configured to receive second light and direct the second light into the light guide as guided light that is guided between the first surface and the second surface; and focusing optics configured to collimate the first light to emerge from the light guide through the second surface of the light guide as collimated projected light.

2. The illumination system of claim 1, further comprising a first light source configured to generate the first light.

3. The illumination system of claim 2, wherein the first light source comprises a plurality of first individually addressable light-emitting diodes.

4. The illumination system of claim 2, wherein the first light source comprises a light-emitting diode (LED) array.

5. The illumination system of claim 4, wherein the LED array includes at least two LEDs that emit light having different correlated color temperatures.

6. The illumination system of claim 4, further comprising a controller configured to:

electrically control the LED array;

electrically power one of a plurality of specified subsets of LEDs of the LED array, and receive input that specifies which of the plurality of specified subsets is to be electrically powered.

7. The illumination system of claim 4, wherein:

the LED array includes a first LED; and the focusing optics includes a first lens positioned in a first optical path between the first LED and the first surface of the light guide.

8. The illumination system of claim 4, wherein:

the LED array includes a first LED; and the focusing optics includes a first curved portion disposed on the first surface of the light guide and a second curved portion disposed on the second surface of the light guide, the first and second curved portions configured to collimate light emitted from the first LED.

9. The illumination system of claim 2, further comprising a second light source that is spaced apart from the first light source and configured to generate the second light.

10. The illumination system of claim 9, wherein the second light source is spaced apart from the first light source and configured to direct the second light into an edge of the light guide, the edge extending between the first and second surfaces of the light guide.

11. The illumination system of claim 9, wherein the second light source comprises a light-emitting diode.

12. The illumination system of claim 1, wherein the focusing optics is located external to the light guide or at the first surface of the light guide.

13. The illumination system of claim 1, further comprising a plurality of light-extraction features disposed on the second surface of the light guide and configured to direct at least some of the guided light out of the light guide through the second surface of the light guide as scattered light, wherein the first light does not interact with the plurality of light-extraction features.

14. A method for providing illumination, the method comprising:

receiving first light into a light guide through a first surface of the light guide;

collimating the first light, with focusing optics, to emerge from the light guide through a second surface of the light guide as collimated projected light, the second surface of the light guide being opposite the first surface of the light guide;

receiving second light into the light guide as guided light that is guided between the first surface and the second surface; and directing, with a plurality of light-extraction features, at least some of the guided light out of the light guide through the second surface of the light guide as scattered light.

15. The method of claim 14, further comprising:

generating the first light with a first light source; and generating the second light with a second light source that is spaced apart from the first light source.

16. The method of claim 15, wherein the first light source comprises a light-emitting diode (LED) array and the second light source comprises an LED.

17. The method of claim 16, further comprising:

receiving input that specifies a first subset of a plurality of specified subsets of LEDs of the LED array; and electrically powering the first subset of the plurality of specified subsets of LEDs of the LED array.

18. The method of claim 17, wherein the LED array includes at least two LEDs that emit light having different correlated color temperatures.

19. The method of claim 14, wherein the focusing optics is located external to the light guide or at the first surface of the light guide.

20. An illumination system, comprising:

a light guide having a first surface and a second surface opposite the first surface, the light guide defining a hole extending through the light guide from the first surface to the second surface;

a first light source configured to emit first light;

focusing optics configured to at least partially focus the first light and direct the first light through the hole in the light guide to emerge from the hole at the second surface of the light guide as projected light; and a second light source spaced apart from the first light source and configured to direct second light into the light guide as guided light that is guided between the first surface and the second surface.

* * * * *